United States Patent
Bae

(10) Patent No.: US 11,068,859 B2
(45) Date of Patent: Jul. 20, 2021

(54) CONDITION BASED PREVENTIVE MAINTENANCE APPARATUS AND METHOD FOR LARGE OPERATION SYSTEM

(71) Applicant: Industry-University Cooperation Foundation Hanyang University, Seoul (KR)

(72) Inventor: Suk Joo Bae, Seoul (KR)

(73) Assignee: Industry-University Cooperation Foundation Hanyang University, Seoul (KR)

( * ) Notice: Subject to any disclaimer, the term of this patent is extended or adjusted under 35 U.S.C. 154(b) by 578 days.

(21) Appl. No.: 15/865,676

(22) Filed: Jan. 9, 2018

(65) Prior Publication Data

US 2018/0130032 A1    May 10, 2018

Related U.S. Application Data

(63) Continuation of application No. PCT/KR2016/007529, filed on Jul. 11, 2016.

(30) Foreign Application Priority Data

Jul. 10, 2015    (KR) .................. 10-2015-0098524

(51) Int. Cl.
    *G05B 23/02*    (2006.01)
    *G06N 7/00*    (2006.01)
    *G06Q 10/00*    (2012.01)
    *G06N 20/00*    (2019.01)

(52) U.S. Cl.
CPC .......... *G06Q 10/20* (2013.01); *G05B 23/0232* (2013.01); *G05B 23/0283* (2013.01); *G06N 7/005* (2013.01); *G06N 20/00* (2019.01)

(58) Field of Classification Search
CPC ................ G06Q 10/20; G05B 23/0232; G05B 23/0283; G06N 7/005
See application file for complete search history.

(56) References Cited

FOREIGN PATENT DOCUMENTS

| KR | 10-2008-0044508 A | 5/2008 |
|---|---|---|
| KR | 10-2011-0107096 A | 9/2011 |
| KR | 10-2012-0038729 A | 4/2012 |

OTHER PUBLICATIONS

Yanbing et al., "Fault Recognition of Large Steam Turbine Based on Higher Order Spectral Features of Vibration Signals;" 2011; IEEE; International Conference on Mechatronics and Automation; pp. 1572-1577 (Year: 2011).*

(Continued)

*Primary Examiner* — Janet L Suglo
(74) *Attorney, Agent, or Firm* — Sughrue Mion, PLLC

(57) ABSTRACT

Disclosed are a condition based preventive maintenance apparatus and method for a large operation system. The condition based preventive maintenance apparatus for a large operation system comprises: a collection part for collecting sensor data from a plurality of sensors installed in a system; a feature extraction part for wavelet-transforming the collected sensor data and extracting an energy spectrum as a feature value; a calculation part for calculating a slope and an intercept of the extracted feature value; and a monitoring part for monitoring whether the system is broken or not using the calculated slope and intercept.

9 Claims, 2 Drawing Sheets

(56) References Cited

OTHER PUBLICATIONS

Mun Jun Jang, "Health Monitoring of Train Wheel Using Energy-Based Wavelet", Master's Thesis, Graduate School of Hanyang University: Department of Industrial Engineering, Aug. 2013, 48 pages.
Dong Yoon Jang et al., "A Monitoring System for Functional Input Data in Multi-phase Semiconductor Manufacturing Process", Journal of the Korean Institute of Industrial Engineers, Sep. 2010, 12 pages, vol. 36, No. 3.
Office Action issued from Korean Patent Application No. 10-2015-0098524 dated Feb. 29, 2016.
Notice of Allowance issued from Korean Patent Application No. 10-2015-0098524 dated Sep. 20, 2016.
International Search Report for PCT/KR2016/007529 dated Oct. 4, 2016 [PCT/ISA/210].

* cited by examiner

CONDITION BASED PREVENTIVE MAINTENANCE APPARATUS AND METHOD FOR LARGE OPERATION SYSTEM

CROSS-REFERENCE TO RELATED APPLICATIONS

This application is a Continuation of PCT International Application No. PCT/KR2016/007529, which was filed on Jul. 11, 2016, and which claims priority from Korean Patent Application No. 10-2015-0098524 filed with the Korean Intellectual Property Office on Jul. 10, 2015. The disclosures of the above patent applications are incorporated herein by reference in their entirety.

BACKGROUND

1. Technical Field

The present invention relates to a condition based preventive maintenance apparatus and method for predicting the aging of a large operation system and detecting malfunctions beforehand.

2. Description of the Related Art

Condition based maintenance, which is gaining much attention in various industries, is an approach that utilizes rapid advances in sensors and computational processing technology for monitoring the aging of a system to detect anomalies in their early stages and prevent malfunctions beforehand.

Condition based preservation may entail performing maintenance actions by monitoring a system in real time, evaluating the condition of the system, and detecting anomalies or signs of malfunctions beforehand, and can thus minimize unnecessary costs such as due to replacements for malfunctioning parts and opportunity costs resulting from system failures.

The existing time-scheduled maintenance, which involves replacing a part or system unconditionally when a particular duration of time passes, allows easy application, but on the other hand cannot prevent malfunctions by 100% and entails the possibility of unnecessary excess costs due to over-maintenance. However, condition based maintenance is a novel concept that can achieve 100% malfunction prevention by monitoring the status of a system in real time with sensors to determine whether or not there are anomalies and predict when the possibility of a malfunction occurring reaches a critical level, so that maintenance work may be applied beforehand.

Existing research on condition based maintenance centered on differentiating normal and abnormal conditions by using an artificial neural network, a support vector machine, or a genetic algorithm.

The condition of a system may be quantified with real time monitoring from sensors, but since the quantified data includes noise, the characteristics of the system cannot be extracted accurately. In general, cases using direct condition monitoring, which is to monitor properties that are directly related to malfunctions, are used relatively less often; the majority of the cases using indirect condition monitoring, which is to monitor properties that are deemed to be associated with malfunctions. Typical examples of indirect condition monitoring used at industrial sites may include vibration monitoring, temperature monitoring, and oil residue analysis.

In the related art, the concept of maintenance may involve handling a malfunction after it has occurred, and even if a preventive measure is adopted, noise in the variables may render the prediction rate significantly low. Also, the related art may rely on manpower in monitoring sensor data, with persons checking the data visually, and the sensor data may not be properly managed due to the environment in which the sensors are attached or due to differences in workers' abilities.

SUMMARY OF THE INVENTION

An aspect of the invention is to provide an apparatus and a method for condition based preventive maintenance that utilize a linear profile including Hurst coefficients based on signal analysis results of sensor data to determine the presence or absence of anomalies in a system, predict the aging of the system, and detect malfunctions beforehand.

One aspect of the present invention provides a condition based preventive maintenance method that utilizes a linear profile including Hurst coefficients based on signal analysis results of sensor data to determine the presence or absence of anomalies in a system, predict the aging of the system, and detect malfunctions beforehand.

An embodiment of the invention can provide a condition based preventive maintenance method for a large operation system, where the method includes: (a) collecting sensor data from a multiple number of sensors installed in a system; (b) extracting an energy spectrum as feature values by applying a wavelet transform on the collected sensor data; (c) calculating a slope and an intercept of the extracted feature values; and (d) monitoring whether or not the system has a malfunction by using the calculated slope and intercept.

Step (b) can include extracting the feature values by deriving Hurst coefficients via an energy spectrum analysis on the wavelet transforms of the sensor data.

Step (b) can include extracting the feature values by calculating energy mean values for a detail signal (father) from the wavelet transforms of the sensor data, where the slope and intercept can be the slope and intercept for an energy spectrum of the detail signal.

Step (d) can include calculating a $T^2$ statistic by using the slope and intercept and monitoring whether or not the system has a malfunction by using the calculated $T^2$ statistic.

Step (d) can include monitoring whether or not the system has a malfunction by comparing the calculated $T^2$ statistic with an upper control limit.

Another aspect of the present invention provides a condition based preventive maintenance apparatus that utilizes a linear profile including Hurst coefficient based on signal analysis results of sensor data to determine the presence or absence of anomalies in a system, predict the aging of the system, and detect malfunctions beforehand.

An embodiment of the invention can provide a condition based preventive maintenance apparatus for a large operation system, where the apparatus includes: a collection part configured to collect sensor data from a multiple number of sensors installed in a system; a feature extraction part configured to extract an energy spectrum as feature values by applying a wavelet transform on the collected sensor data; a calculation part configured to calculate a slope and an intercept of the extracted feature values; and a monitoring part configured to monitor whether or not the system has a malfunction by using the calculated slope and intercept.

The feature extraction part can extract the feature values by deriving Hurst coefficients via an energy spectrum analysis on the wavelet transforms of the sensor data.

The feature extraction part can extract the feature values by calculating energy mean values for a detail signal (father) from the wavelet transforms of the sensor data, where the slope and intercept can be the slope and intercept for an energy spectrum of the detail signal.

The monitoring part can calculate a $T^2$ statistic by using the slope and intercept and can monitor whether or not the system has a malfunction by using the calculated $T^2$ statistic.

The monitoring part can monitor whether or not the system has a malfunction by comparing the calculated $T^2$ statistic with an upper control limit.

An apparatus and a method for condition based preventive maintenance according to an embodiment of the invention may utilize a linear profile including Hurst coefficients based on signal analysis results of sensor data to provide the advantages of determining the presence or absence of anomalies in a system, predicting the aging of the system, and detecting malfunctions beforehand.

An embodiment of the invention can thus evaluate the condition of the system and detect signs of anomalies and malfunctions beforehand, whereby the unnecessary spending of cost and time can be minimized.

DETAILED DESCRIPTION OF THE INVENTION

Figure 1:
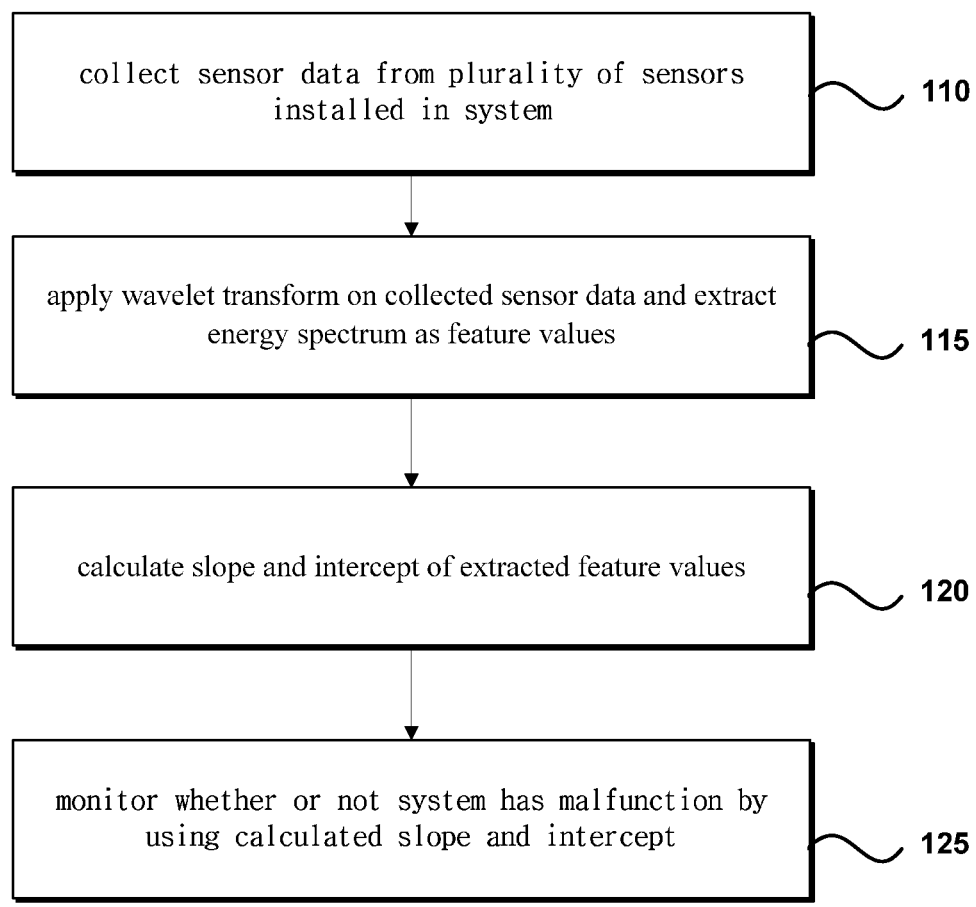
FIG. 1 is a flow diagram illustrating a condition based preventive maintenance method for a large operation system according to an embodiment of the invention.

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In the description of the present invention, certain detailed explanations of related art are omitted if it is deemed that they may unnecessarily obscure the essence of the invention.

While such terms as "first" and "second," etc., may be used to describe various components, such components must not be limited to the above terms. The above terms are used only to distinguish one component from another. For example, a first component may be referred to as a second component without departing from the scope of rights of the present invention, and likewise a second component may be referred to as a first component. The term "and/or" encompasses both combinations of the plurality of related items disclosed and any item from among the plurality of related items disclosed.

The terms used in the present specification are merely used to describe particular embodiments, and are not intended to limit the present invention. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Certain embodiments of the present invention are described below in more detail with reference to the accompanying drawings.

FIG. 1 is a flow diagram illustrating a condition based preventive maintenance method for a large operation system according to an embodiment of the invention. In the descriptions that follow, it is supposed that a multiple number of sensors are installed in a large operation system such as a steam turbine generator. Here, the multiple sensors can include two or more different types of sensors. Although the present specification describes the invention using an example in which it is supposed that the system is installed with multiple numbers of temperature sensors and vibration sensors and acquires sensor data from each of the temperature sensors and vibration sensors, various other types of sensors can also be used.

In step 110, a condition based preventive maintenance apparatus 100 may collect sensor data from a multiple number of sensors in a system.

The system can be installed with, for example, a multiple number of temperature sensors. In this case, the condition based preventive maintenance apparatus can collect the temperature data measured by the temperature sensors installed in the system as sensor data.

The sensor data collected from each sensor in this manner can include noise.

Therefore, in step 115, the condition based preventive maintenance apparatus 100 may apply a wavelet transform on the collected sensor data to extract the energy spectrum as feature values.

By applying the wavelet transform, the condition based preventive maintenance apparatus can not only remove noise included in the collected sensor data but also extract the energy spectrum as feature values.

A condition based preventive maintenance apparatus according to an embodiment of the invention can extract the feature values by deriving Hurst coefficients via an energy spectrum analysis of the wavelet transforms of the sensor data.

Also, a condition based preventive maintenance apparatus according to an embodiment of the invention can extract the energy spectrum as feature values by calculating energy mean values for a detail signal (father) from the wavelet transforms of the sensor data This will be more easily understood from the descriptions provided below.

A wavelet domain has a conflicting relationship with time localization due to constraints of scaling and the Heisenberg principle and provides adaptive integration. Also, the wavelet domain is an expression of the time measure of a signal, and a wavelet transform is effective in controlling and reducing noise from data.

A wavelet function is composed of a mother wavelet, which describes the high-frequency portion (the portion that is not flat), and a father wavelet, which describes the low-frequency portion (the portion that is flat).

These may be represented in mathematical form as Equation 1 and Equation 2.

$$\phi_{J_0,k}(t) = 2^{J_0/2}\phi(2^{J_0}t-k); \, k \in Z \quad \text{[Equation 1]}$$

$$\psi_{j,k}(t) = 2^{j/2}\psi(2^j t-k); \, j(\geq J_0), k \in Z \quad \text{[Equation 2]}$$

Considering second-order stationary time series data X(t), the wavelet coefficients $\{d_{j,k}: k \in Z\}$ corresponding to conditions matching all levels $j \in Z$ are non-stationary. Therefore, the energy order for level j can be expressed as Equation 3.

$$\varepsilon_j = E[d_{j,k}^2] \cdot j \in Z \qquad \text{[Equation 3]}$$

$$f_x(Z) = \frac{1}{\sqrt{2\pi}} \int_{x \in R} e^{izs} r_x(s) ds \qquad \text{[Equation 4]}$$

Here, $f_x(Z)$ represents the density function for the energy spectrum.

Here, $r_x(s) = Cov(X(t+s), X(t))$ represents an autocorrelation for X under the condition that $s \in Z$ is satisfied. Based on the peculiarity and changes of the Parseval variable, Equation 3 can be rewritten as Equation 5.

$$\varepsilon_j = \int_R \psi_{j,k}(t) \int_R \psi_{j,k}(s) r_x(t-s) ds dt = \int_R |\hat{\psi}(\xi)|^2 f_x(\xi 2^j) d\xi \qquad \text{[Equation 5]}$$

Here, $$\hat{\psi}(\xi) = \frac{1}{\sqrt{2\pi}} \int_R e^{i\xi t} \psi(t) dt$$

represents a Fourier transform for $\psi$. If the j value is large, $f_X(\xi 2^j)$ becomes an expanded version of the spectral density formula $f_X(\xi)$ for a frequency approaching 0. If the conditions are applied such that X(t) is a long-range non-independent signal and has an infinite spectral density at the source, then as $t \to 0$, Equation 6 can be obtained.

$$f_X(t) \sim c_f |t|^\alpha, \alpha \in (0,1) \qquad \text{[Equation 6]}$$

Here, $c_f > 0$, and the symbol ~ means that the left term and the right term in the equation both converge to 1.

Using Equation 5 and Equation 6, the energy order when $j \to \infty$ can be represented as Equation 7.

$$\varepsilon_j \sim C 2^{-j\alpha} \qquad \text{[Equation 7]}$$

Here, $C = c_f \int_R |\hat{\psi}(\xi)|^2 |\xi|^{-\alpha} d\xi$, and $\alpha$ represents a long-range non-independent variable that can be represented using the Hurst coefficient $H = (1+\alpha)/2$ obtained by inference from a least square regression equation in the wavelet spectrum domain defined by Equation 8 below.

$$\log_2(\varepsilon_j) = \log_2(E[d_{j,k}^2]) \sim (1-2H)j + \text{const } j \to \infty \qquad \text{[Equation 8]}$$

Here, $\log_2(\varepsilon_j)$ can be obtained by finding the mean value of the samples as shown in Equation 9.

$$\{d_{j,k}: l = 1, \ldots, n_j\}, \overline{d_j^2} = \frac{1}{n_j} \sum_{k=1}^{n_j} d_{j,l}^2 \qquad \text{[Equation 9]}$$

Here, $n_j$ represents the bivariate value for the j-level resolution. $\log_2(\varepsilon_j)$, $j = 1, \ldots, J$ can be predicted as in Equation 10 by using the mean value of the sample energy.

$$\log_2(\varepsilon_j) \approx \log_2(\overline{d_j^2}) \qquad \text{[Equation 10]}$$

Here, $\log_2(\overline{d_j^2})$ represents the wavelet spectrum according to resolution level j.

In Equation 8, the long-range non-independent time series grade may form a line with $\Delta = 1-2H$, so that the following may be obtained:

$$H = \frac{1-\Delta}{H}.$$

A brief description is provided below of the Theil-type estimate for the slope using the Hamilton theory.

$\Delta(j_1, j_2)$ can be represented as Equation 11.

$$\Delta(j_1, j_2) = \sum_{(r,s) \in S_{(j_1, j_2)}} \omega_{(j_1, j_2)}(r, s) \delta(r, s) \qquad \text{[Equation 11]}$$

Here, $S_{(j_1, j_2)}$ represents samples for all pairs of quotients from $j_1$ to $j_2$, $\delta_{(r,s)}$ represents the slope between resolution level r and s, and $\omega_{(j_1, j_2)}(r,s)$ represents a weight.

The Theil-type estimate may use a weighted mean value of the slope for each pair and is robust against outliers and distribution constraints that may be present in the estimate.

In Equation 11, $\delta_{(r,s)}$ can be defined as in Equation 12.

$$\delta(r, s) = \frac{\log_2(\overline{d_r^2}) - \log_2(\overline{d_s^2})}{r - s} \qquad \text{[Equation 12]}$$

To consider optimization, a weight $\omega_{(j_1, j_2)}(r,s)$ based on a harmonic mean according to the level of the sample size is used, and this can be represented as Equation 13.

$$\omega_{(j_1, j_2)}(r, s) = \frac{(r-s)^2 \times HA(2^r, 2^s)}{\sum_{(p,q) \in S_{(j_1, j_2)}} (p-q)^2 \times HA(2^p, 2^q)} \qquad \text{[Equation 13]}$$

In Equation 13, $HA(2^p, 2^q) = (2^{-(p+1)} + 2^{-(q+1)})^{-1}$. Also, the weight $\omega_{(j_1, j_2)}(r,s)$ is inversely proportional to the variance of $\delta_{(r,s)}$. This is a result of the differentiation proposed by Hamilton, and the weight for each pair is designed to protect the estimate from the abnormal effects of outliers.

By using $\Delta(j_1, j_2)$ from Equation 11, the Hurst coefficient can be estimated as in Equation 14.

$$\hat{H} = \frac{1 - \Delta(j_1, j_2)}{2} \qquad \text{[Equation 14]}$$

The wavelet energy spectrum of long-range non-independent time series coefficients has a linear relationship with a slope of 1-2H.

The Hurst coefficient can be estimated by matching a regression line to the wavelet energy spectrum according to resolution level j.

In an embodiment of the invention, the time series data transformed to a wavelet energy spectrum can be observed by using a multivariate control chart.

In step 120, the condition based preventive maintenance apparatus 100 may calculate the slope and the intercept of the extracted feature values. For monitoring purposes, all observation times are divided into n blocks, and the relationship between the log wavelet energy spectrum ($y_j=\log_2(\varepsilon_j)$) and the resolution level ($x_j=j$) is linear with respect to the l-th block. This can be represented as Equation 15.

$$y_{jl}=\beta_0+\beta_1 x_j+\epsilon_{jl}, j=1,\ldots,J \qquad \text{[Equation 15]}$$

Here, $\epsilon_{jl}$ is independent and uniformly follows a normal distribution with mean value 0 and variance value $\sigma^2$. To adequately execute Equation 15, the value of $x_j$ is fixed, and the same values are brought from each block.

The slope and intercept for block l can be estimated by using the least squares method.

The least square estimates of $\beta_0$ and $\beta_1$ for block l can be represented as Equation 16.

$$b_{0l}=\bar{y}_l-b_{1l}\bar{x}, \text{ and } b_{1l}=\frac{S_{xy}(l)}{S_{xx}} \qquad \text{[Equation 16]}$$

Here, $\bar{y}_l=\Sigma_{j=1}^J y_{jl}/J$, $\bar{x}=\Sigma_{j=1}^J x_j/J$, $S_{xy}(l)=\Sigma_{j=1}^J(x_j-\bar{x})(y_{jl}-\bar{y}_l)$, and $S_{xx}=\Sigma_{j=1}^J(x_j-\bar{x})^2$.

Also, by using the residual $e_{jl}=y_{jl}-b_{0l}-b_{1l}x_j$, the variance value for the error $\epsilon_{jl}$ can be estimated as $MSE_l=(J-2)^{-1}\Sigma_{j=1}^J e_{jl}^2$. In the equation for estimating the variance value for the error, $\epsilon_{jl}$ is an independent function and follows a normal distribution with mean value 0 and variance value $\sigma^2$.

In a selected block l, the least square estimates of $b_{0l}$ and $b_{1l}$ follow a bivariate normal distribution having a mean vector of $\mu=(\beta_0, \beta_1)^T$ and a variance-covariance matrix of $\Sigma\equiv(\sigma_0^2, \sigma_{01}; \sigma_{01}, \sigma_1^2)$. Here, $\sigma_0^2=\sigma^2(J^{-1}+\bar{x}^2 S_{xx}^{-1})$, $\sigma_1^2=\sigma^2 S_{xx}^{-1}$, $\sigma_{01}=-\sigma^2 \bar{x} S_{xx}^{-1}$, and $b_{0l}$ and $b_{1l}$ represent variance and covariance.

*To resolve the variable estimate problem of Equation 15, the variable estimates for $b_{0l}$ and $b_{1l}$ and the variance value $MSE_l$ for each block $l=1,\ldots,n$ can be used to calculate the estimate for $\mu=(\beta_0,\beta_1)^T$ and $\sigma^2$ as in Equation 17.

$$b_0=\frac{\sum_{l=1}^n b_{0l}}{n}, b_1=\frac{\sum_{l=1}^n b_{1l}}{n}, \text{ and } \widehat{\sigma^2}\equiv MSE=\frac{\sum_{l=1}^n MSE_l}{n} \qquad \text{[Equation 17]}$$

Here, $b_0$, $b_1$, and $\hat{\sigma}^2$ represent unbiased estimates of $\beta_0$, $\beta_1$, and $\sigma^2$, respectively. Also, Equation 17 satisfies $Var(b_0)=\sigma_0^2/n$ and $Var(b_1)=\sigma_1^2/n$, so that as $n\to\infty$, it follows that $Var(b_0)\to 0$ and $Var(b_1)\to 0$.

In step 125, the condition based preventive maintenance apparatus 100 can monitor the system for malfunctions by using the calculated slope and intercept.

More specifically, the condition based preventive maintenance apparatus according to an embodiment of the invention can use the slope and intercept to calculate the $T^2$ statistic and can use the calculated $T^2$ statistic to monitor whether or not the system has from a malfunction.

Here, the condition based preventive maintenance apparatus can monitor the system for malfunctions by comparing the calculated $T^2$ statistic with the upper control limit.

A more detailed description is provided below.

Process monitoring may be performed based on control charts that include two phases (Phase I and Phase II). After measuring process variables within the control range based on the data of Phase I, in order to describe whether or not the process will continue in a stable manner, the control limit calculated in Phase I can be used in observing future readouts.

An embodiment of the invention can perform two-phase monitoring so as to find initial faults in the system.

When observing a linear profile, the $T^2$ statistic can be calculated by using Equation 18.

$$T_l^2=(z_l-\mu)^T \Sigma^{-1}(z_l-\mu) \qquad \text{[Equation 18]}$$

When a process step is controllable, $T_l^2$ follows a chi-squared distribution with a degree of freedom of 2 and an upper control limit of $UCL=\chi_\alpha^2(2)$. Here, $\chi_\alpha^2(2)$ represents the 100(1-$\alpha$) percentile of a chi-squared distribution having a degree of freedom of 2.

If there is a change in the process prediction, then $T_l^2$ follows a non-central $\chi^2$ and has the non-central variable $\tau=J(\lambda+\psi\hat{x})^2+\psi^2 S_{xx}$.

In the non-central variable equation, $\lambda$ and $\psi$ are formed by $\sigma$ and refer to change in the intercept $\beta_0$ and change in the slope $\beta_1$.

Since it is realistically difficult to know the process variables of the control range values, they must be estimated from the data obtained through the process step of Phase I. If all values are within the control limits, then $b_0$ and $b_1$, which are the best estimates of $\beta_0$ and $\beta_1$, can be determined from $Y=b_0+b_1 X$ mentioned above.

However, if a certain value lies beyond the control limits, then the data may be deleted from the data set. The condition based preventive maintenance apparatus 100 may newly calculate the estimates of $b_0$, $b_1$ with the remaining data and may check again whether or not all data values are within the control limits.

The procedures above can be repeated so that the statistics calculated with the remaining data are within the control limits for all blocks.

Also, the condition based preventive maintenance apparatus 100 can generate reference profiles for notable influences in Phase I.

Under the assumption that $\mu$ and $\Sigma$ are unknown, the $T^2$ statistics for block l can be modified as Equation 19.

$$T_{0l}^2=\frac{n}{n-1}(z_l-\mu_0)^T S^{-1}(z_l-\mu_0) \qquad \text{[Equation 19]}$$

Here, $\mu_0\equiv(b_0, b_1)^T$ is an unbiased estimate of $\mu$, and the sample variance and covariance matrix $S\equiv(S_{11}, S_{12}; S_{12}, S_{22})$ is an unbiased estimate of $\Sigma$. Also, $S_{11}=MSE(J^{-1}+\hat{x}S_{xx}^{-1})$, $S_{22}=MSE S_{xx}^{-1}$, and $S_{12}=-MSE \bar{x} S_{xx}^{-1}$.

Since the modified $T^2$ statistics are associated with a distribution having a degree of freedom of (2, (j-2)n), Phase I comes to have the upper control limit of $UCL=2F_{2,(J-2)n,\alpha}$. Here, $F_{2,(J-2)n,\alpha}$ represents the 100(1-$\alpha$) percentile of an F distribution having a degree of freedom of (2, (j-2)n).

In an embodiment of the invention, alterations or changes in process variance may be evaluated by using market risk measurement (EWMA) and R-charts. The upper control limit of an EWMA chart utilizing residuals can be determined as Equation 20.

$$UCL_{EWMA}=L\sqrt{MSE}\sqrt{\frac{\theta}{(2-\theta)J}}, \qquad \text{[Equation 20]}$$

$$LCL_{EWMA}=-L\sqrt{MSE}\sqrt{\frac{\theta}{(2-\theta)J}}$$

Here, $\theta$ represents a weight that satisfies the condition $0<\theta<1$, and L represents the standard deviation of the statistics of many blocks describing error detection rate. Typically, the values are set to L=3, and θ=0.08, 0.10, 0.15 or 0.2.

The EWMA chart has the problem that, when several samples have signals values outside the control range, the methods for removing samples and recalculating limits are not definitely defined.

In the case of the R-chart, a supplementary method can adopt the upper control limit as Equation 21.

$$UCL_R=\sqrt{MSE}(d_2-Ld_3), LCL_R=\sqrt{MSE}(d_2+Ld_3)$$ [Equation 21]

Here, $d_2$ and $d_3$ represent fixed functions associated with the range and standard deviation, respectively.

Figure 2:
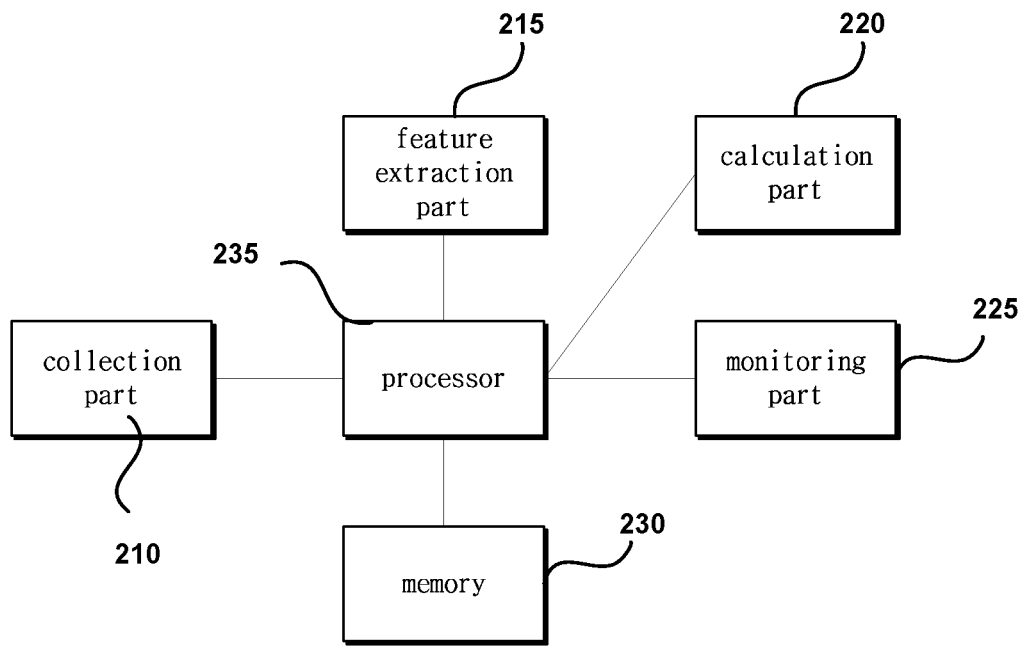
FIG. 2 is a block diagram conceptually illustrating the inner composition of a condition based preventive maintenance apparatus for a large operation system according to an embodiment of the invention.

FIG. 2 is a block diagram conceptually illustrating the inner composition of a condition based preventive maintenance apparatus for a large operation system according to an embodiment of the invention.

Referring to FIG. 2, a condition based preventive maintenance apparatus 100 for a large operation system according to an embodiment of the invention may include a collection part 210, a feature extraction part 215, a calculation part 220, a monitoring part 225, a memory 230, and a processor 235.

The collection part 210 may serve to collect the sensor data from multiple sensors installed in the system. As already described above, the large operation system can be a system such as a steam turbine generator and can have a multiple number of sensors attached throughout the system. As it is supposed that the system is a generator in describing an embodiment of the invention, it is supposed that the sensors include multiple temperature sensors and vibration sensors. However, the types of sensors may obviously vary according to the properties of the system.

The feature extraction part 215 can apply a wavelet transform on the collected data and extract the energy spectrum as feature values.

In one example, the feature extraction part 215 can extract the feature values by deriving Hurst coefficients through an energy spectrum analysis on the wavelet transforms of the sensor data.

Also, the feature extraction part 215 can extract the energy spectrum as feature values by calculating the energy mean values for the detail signal (father) from the wavelet transforms of the sensor data.

This is as already described above with reference to FIG. 1, and as such, redundant descriptions are omitted here.

The calculation part 220 may serve to calculate the slope and the intercept of the extracted feature values.

In one example, the calculation part 220 can calculate the slope and the intercept for the energy spectrum of the detail signal.

This is as already described above with reference to FIG. 1, and as such, redundant descriptions are omitted here.

The monitoring part 225 may serve to monitor whether or not the system has a malfunction by using the calculated slope and intercept.

In one example, the monitoring part 225 can use the slope and intercept to calculate the $T^2$ statistics and can monitor the system for malfunctions by using the calculated $T^2$ statistics. Here, the monitoring part 225 can monitor the system for malfunctions by comparing the calculated $T^2$ statistics with the upper control limit.

This is as already described above with reference to FIG. 1, and as such, redundant descriptions are omitted here.

The memory 230 may store various algorithms and applications needed to perform the condition based preventive maintenance method for determining the presence or absence of anomalies in the system by utilizing a linear profile that includes Hurst coefficients based on the results of signal analysis performed on the sensor data, as well as the various data associated with the procedures involved.

The processor 235 may be a device for controlling the inner components (e.g. the collection part 210, feature extraction part 215, calculation part 220, monitoring part 225, memory 230, etc.) of the condition based preventive maintenance apparatus 100 according to an embodiment of the invention.

While the spirit of the invention has been described in detail with reference to particular embodiments, it is to be appreciated that the person having ordinary skill in the art can change or modify the embodiments without departing from the scope and spirit of the invention.

INDUSTRIAL APPLICABILITY

An embodiment of the invention is applicable to large-capacity systems.

What is claimed is:

1. A condition-based preventive maintenance method performed by an apparatus including a processor for a steam turbine generator, the method comprising:
   (a) collecting, by the processor, sensor data from a plurality of sensors installed in the steam turbine generator;
   (b) extracting, by the processor, an energy spectrum as feature values by applying a wavelet transform on the collected sensor data;
   (c) calculating, by the processor, a slope and an intercept of the extracted feature values; and
   (d) monitoring, by the processor, whether or not the steam turbine generator has a malfunction by using the calculated slope and intercept,
   wherein said step (b) comprises extracting, by the processor, the feature values by calculating energy mean values for a detail signal (father) from the wavelet transforms of the sensor data, and
   wherein the slope and intercept are a slope and an intercept for an energy spectrum of the detail signal.

2. The condition-based preventive maintenance method according to claim 1, wherein said step (b) comprises:
   extracting, by the processor, the feature values by deriving Hurst coefficients via an energy spectrum analysis on the wavelet transforms of the sensor data.

3. The condition-based preventive maintenance method according to claim 1, wherein said step (d) comprises:
   calculating, by the processor, a $T^2$ statistic by using the slope and intercept and monitoring whether or not the steam turbine generator has a malfunction by using the calculated $T^2$ statistic.

4. The condition-based preventive maintenance method according to claim 3, wherein said step (d) comprises:
   monitoring, by the processor, whether or not the steam turbine generator has a malfunction by comparing the calculated $T^2$ statistic with an upper control limit.

5. A non-transitory computer-readable recorded medium product having recorded thereon a set of program code for performing the condition-based preventive maintenance method according to claim 1.

6. A condition-based preventive maintenance apparatus for a steam turbine generator, the apparatus comprising:
   a memory storing at least one command; and
   a processor executing the command,
   wherein the command comprises instruction to implement operations of:

collecting sensor data from a plurality of sensors installed in the steam turbine generator;
extracting an energy spectrum as feature values by applying a wavelet transform on the collected sensor data;
calculating a slope and an intercept of the extracted feature values; and
monitoring whether or not the steam turbine generator has a malfunction by using the calculated slope and intercept,
wherein the extracting comprises extracting the feature values by calculating energy mean values for a detail signal (father) from the wavelet transforms of the sensor data, and
wherein the slope and the intercept are a slope and an intercept for an energy spectrum of the detail signal.

7. The condition-based preventive maintenance method according to claim 6, wherein the extracting comprises:
extracting the feature values by deriving Hurst coefficients via an energy spectrum analysis on the wavelet transforms of the sensor data.

8. The condition-based preventive maintenance apparatus according to claim 6, wherein the monitoring comprises:
calculating a $T^2$ statistic by using the slope and intercept and monitors whether or not the steam turbine generator has a malfunction by using the calculated $T^2$ statistic.

9. The condition-based preventive maintenance apparatus according to claim 8, wherein the monitoring comprises:
monitoring whether or not the steam turbine generator has a malfunction by comparing the calculated $T^2$ statistic with an upper control limit.

* * * * *